(12) United States Patent
Lipka et al.

(10) Patent No.: US 11,184,449 B2
(45) Date of Patent: Nov. 23, 2021

(54) NETWORK-BASED PROBABILISTIC DEVICE LINKING

(71) Applicant: Adobe Inc., San Jose, CA (US)

(72) Inventors: Nedim Lipka, Santa Clara, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 305 days.

(21) Appl. No.: 15/214,303

(22) Filed: Jul. 19, 2016

(65) Prior Publication Data

US 2018/0027084 A1 Jan. 25, 2018

(51) Int. Cl.
*H04L 29/08* (2006.01)
*H04L 12/24* (2006.01)
*H04L 12/741* (2013.01)

(52) U.S. Cl.
CPC .......... *H04L 67/22* (2013.01); *H04L 41/069* (2013.01); *H04L 41/0893* (2013.01); *H04L 67/18* (2013.01); *H04L 67/306* (2013.01); *H04L 45/74* (2013.01)

(58) Field of Classification Search
CPC ....... H04L 67/22; H04L 43/065; H04L 45/74; H04L 67/306
USPC .......................................................... 709/224
See application file for complete search history.

(56) References Cited

U.S. PATENT DOCUMENTS

| | | | |
|---|---|---|---|
| 2009/0037602 A1* | 2/2009 | Patel ....................... | H04L 67/18 709/245 |
| 2012/0054043 A1* | 3/2012 | Agarwal ................ | G06Q 30/02 705/14.71 |
| 2013/0124309 A1* | 5/2013 | Traasdahl ............... | H04L 67/22 705/14.49 |
| 2014/0095320 A1* | 4/2014 | Sivaramakrishnan .. | H04W 4/21 705/14.66 |
| 2016/0182657 A1* | 6/2016 | Mukherjee .............. | H04L 67/22 709/223 |

* cited by examiner

*Primary Examiner* — Kevin S Mai
(74) *Attorney, Agent, or Firm* — FIG. 1 Patents

(57) ABSTRACT

Network-based probabilistic device linking techniques are described that link multiple devices associated with a common entity. In one example, log records are received from service providers including a device identifier and an IP address associated with a computing device that uses the service providers to access resources. The received log records are filtered and analyzed to identify connection frequencies between each device identifier and various IP addresses. Connection frequencies are scored and used to identify a subset of connections for computing linked devices belonging to a common entity, such as a single user, a household of users, users in a specific location, and so on. Linked devices are computed from the subset of selected connections and combined into linked device clusters. These linked device clusters can then be output so that market analysis can be performed on the linked device cluster rather than data pertaining to a single device.

20 Claims, 6 Drawing Sheets

NETWORK-BASED PROBABILISTIC DEVICE LINKING

BACKGROUND

With the widespread usage of computing devices, individual users often have multiple different types computing devices. For example, a single user may own a desktop computer, a mobile phone, a tablet computer, a "smart" television, a wearable computing device, and so on. These computing devices are often used to access online resources provided by various service providers. In one example scenario, a user may use a desktop computer while at work to access e-mail and to navigate through web pages of a service provider's website. During this access and navigation, the user is exposed to additional resources relating to the email or web pages, such as advertisements, links to different web pages, attached documents, and so on. In another example scenario, the same user may use a smart television while at home to access resources such as television programming, movies, advertisements, and so on. Each time a user accesses one of these resources via a computing device, a service provider associated with the resource generates a log record that includes information about the device that was used to access the resource, an IP address used to access the resource, a time and date of the access, and so on. These log records are used to perform marketing analysis on interaction with the various resources.

Marketing analysis of resource interaction is useful for a variety of purposes aimed at improving user experience including service provider analytics, marketing targeting and retargeting, building better user profiles, and so on. For example, using marketing analysis to identify resources that are likely of interest to a user enables a service provider to create different user experiences for each user. With a large number of service providers competing for users' attention, the success of a service provider depends on its ability to provide resources that captivate user interest.

Service providers can build user profiles based on monitored activity for individual computing devices. However, because users may access different service provider resources when they use different computing devices, building a user profile based on monitored activity with a single computing device does not accurately categorize the overall interests of a user. For example, a user profile constructed from a user's activity with a work computer may only account for work-related activities and not account for resources the user accesses outside of work, such as favorite TV shows watched on a home smart television, social networking activity accessed via a mobile phone, and so on. The user may then be discouraged from returning to a service provider to access personal content if the service provider has tailored a user experience based only on a history of resources accessed by a work computer. This hinders a service provider's ability to further engage the user with service provider resources.

SUMMARY

Network-based probabilistic device linking techniques are described herein. In one example, log records are received from service providers that include a device identifier and an IP address associated with a device used to access service provider resources. The device identifier includes information about the device used to access the resource, such as HyperText Transfer Protocol (HTTP) header data, "cookies", network connections, and so on. The received log records are then optionally filtered to remove log records corresponding to users that opted-out of sharing information associated with their computing device usage. For example, in an implementation a service provider presents a selectable option for a user to share anonymous information with the service provider when the user accesses a service provider resource. The received log records are also filtered to remove log records that are not useful in identifying individual users, such as log records associated with "bots" or IP addresses commonly used by a large number of different users. In this manner, the received log records are filtered to use only log records having the greatest pertinence for the device linking techniques discussed herein.

Connections between device identifiers and IP addresses in the received log records are then scored. A score assigned to the connection between an individual device identifier and an IP address indicates a frequency with which the device identifier used the IP address to access service provider resources within a specified period of time. A highest connection score for a computing device identifier indicates an IP address that was most frequently used by a device corresponding to the device identifier. Similarly, a lower connection score indicates an IP address used less frequently by the computing device.

These connection scores are used to identify a subset of connections between device identifiers and IP addresses useful in determining linked devices. For example, a lower connection score indicating an IP address that is sparsely used by a computing device may indicate that data pertaining to the connection is not useful in identifying linked devices. Thus, by selecting a subset of connections for individual device identifiers based on connection score, only the most relevant connections are used to compute linked devices. As discussed herein, computing linked devices refers to using the connection scores to identify devices that are connected to similar IP addresses and determine a relationship between the identified devices, such as ownership or use by a common entity. By limiting a number of IP address connections that are considered for each device identifier, an amount of processing resources needed to determine linked devices is significantly lower than an amount of processing resources required to compute linked devices using every IP address associated with a device identifier. Different parameters can be used to select a subset of scored connections in order to identify linked devices belonging to a common entity. Examples of common entities include a single user, a household of multiple users, a group of users in a common geolocation, multiple users of a corporation, multiple users of an educational institution, and so on.

Linked devices are computed from the subset of selected connections. Linked devices can be computed by creating a graph consisting of device identifier nodes and IP address nodes corresponding to the device identifiers and IP addresses in the selected subset of connections. Linked devices are identified by a connected-components algorithm that finds different device identifiers connected to similar IP addresses in the graph. When devices are identified as linked, the devices are combined into linked device clusters. These linked device clusters are output so that market analysis can be performed on the linked device cluster rather than on a single device. In this manner, the network-based probabilistic device linking techniques discussed herein enable comprehensive analysis of a common entity's interaction with service provider resources across a variety of different service provider and devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and in the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
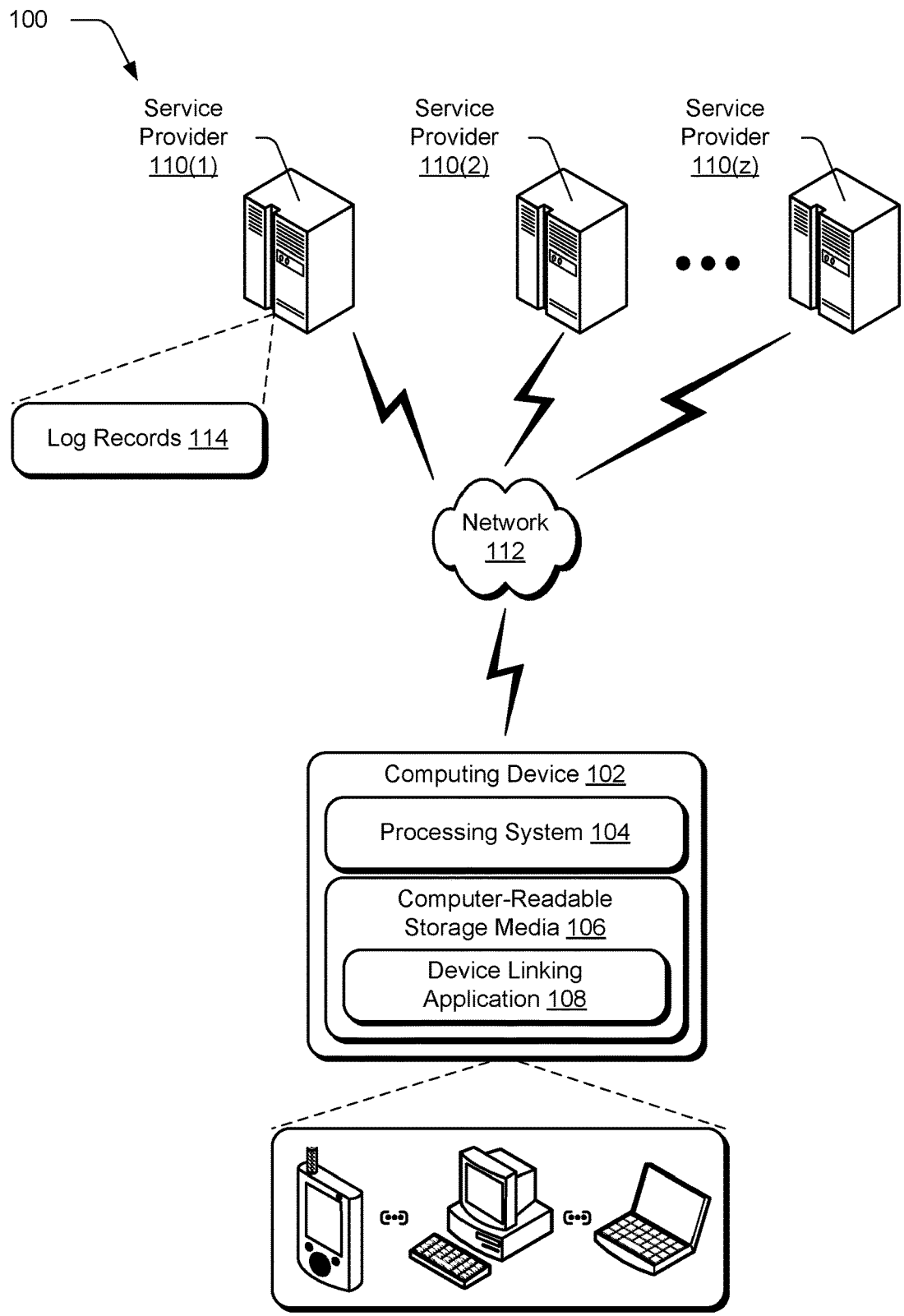
FIG. 1 is an illustration of a digital medium environment in an example implementation that is operable to employ techniques described herein.

Digital service provider success is dependent on a service provider's ability to continuously provide resources that will be of interest to computing device users. As discussed herein, "resources" include at least one of, or various combinations of video, audio, multi-media streams, games, animations, advertisements, images, web documents, web pages, applications, device applications, and the like. In order to identify resources that are likely of interest to users, digital service providers build device profiles based on resources historically accessed by individual computing devices. However, user behavior can vary between different devices. For example, a desktop work computer might be used to access work emails and work documents, while a mobile cell phone might be used to access social networking applications and personal e-mail. Accordingly, device profiles created based on resources accessed by a single device do not provide a comprehensive profile that accounts for user activity among different computing devices. Thus, service providers that provide suggested resources based on only a single device profile are less likely to identify resources that will be of interest to a user. This problem is further compounded when dealing with a common entity that includes multiple users.

A comprehensive understanding of resources that are likely of interest to a common entity must account for the common entity's activity among multiple devices. Accordingly, network-based probabilistic device linking techniques are described that identify multiple devices belonging to a common entity. In an implementation, service providers collect and store IP addresses and device identifiers associated with computing devices accessing service provider resources. These IP addresses and device identifiers are used to identify clusters of linked computing devices in a probabilistic manner. As discussed herein, a cluster of linked devices identifies multiple computing devices belonging to a common entity.

The techniques discussed herein are "probabilistic" in nature, as linked device clusters are determined without first determining an identity of a user in the common entity. For example, linked device clusters are determined based on IP addresses used by various computing devices, as opposed to linking devices based on secure user credentials (i.e., username and password) used to access service provider resources. Linked device clusters are evaluated in terms of their "precision" and "recall". As discussed herein, the recall of a linked device cluster indicates how many devices in the linked device cluster actually belong to a common entity. The precision of a linked device cluster is analogous to recall and indicates a proportion of correctly classified linked devices among all devices considered for linking.

The network-based probabilistic device linking techniques discussed herein generate linked device clusters with high precision and recall values by filtering a number of IP addresses and associated device identifiers before calculating linked devices. IP addresses and device identifiers are filtered based on a variety of parameters, such as a number of device identifiers associated with a single IP address, a number of IP addresses associated with a single device identifier, a connection frequency between IP address and device identifier, specified times, associated locations, and so on.

By limiting an amount of IP addresses and device identifiers that are considered when generating linked device clusters, the techniques discussed herein produce linked device clusters with high precision and recall values while reducing or minimizing an amount of computational resources used to generate the clusters. Generating linked device clusters using the techniques discussed herein is additionally advantageous in maintaining user security, as linked device clusters are generated without ascertaining any confidential user information, such as usernames, passwords, and so on.

As such, network-based probabilistic device linking generates linked device clusters representative of a common entity's interactions with digital service provider resources among multiple different devices. Accordingly, digital service providers can identify resources of interest to increase efficiency of digital marketing and improve user experience. Further discussion of these and other examples is included below.

In the following discussion, an example digital medium environment is first described that can employ the techniques described herein. Example implementation details and procedures are then described which may be performed in the example digital medium environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that may include one or more processing devices, one or more computer-readable storage media 106, and a device linking application 108 embodied on the computer-readable storage media 106 and operable via the processing system 104 to implement corresponding functionality described herein. The device linking application 108 is configured to link multiple devices associated with a common entity based on IP address connections, as described in further detail below.

The computing device 102 may be configured as any suitable type of computing device. For example, the computing device may be configured as a desktop computer, a laptop computer, a mobile device (e.g., assuming a handheld configuration such as a tablet or mobile phone), a tablet, a camera, a wearable device (e.g., assuming a configuration that can be worn by a user such as a watch or glasses) and so forth. Thus, the computing device 102 may range from full resource devices with substantial memory and processor resources (e.g., personal computers, game consoles) to a low-resource device with limited memory and/or processing resources (e.g., mobile and wearable devices). Additionally, although a single computing device 102 is shown, the computing device 102 may be representative of a plurality of different devices to perform operations "over the cloud" as further described in relation to FIG. 6.

The digital medium environment 100 further depicts service providers 110(1), 110(2), ..., 110(z), configured to communicate with computing device 102 over a network 112, such as the Internet, to provide a "cloud-based" computing environment. Although the digital medium environment 100 is illustrated as including three service providers 110, digital medium environment 100 is configured to include any number 'z' of service providers 110. Generally, speaking, each service provider 110 is configured to make resources available over the network 112 to various computing device, such as computing device 102.

When a service provider 110 receives a request for a resource, or otherwise makes a resource available to a computing device, the service provider 110 collects data pertaining to the provided resource and the computing device to which the resource was provided. For example, when a service provider 110 provides a resource to a computing device, the service provider ascertains an IP address used by the computing device to access the resource. In one or more implementations, the service provider 110 additionally ascertains device identifier information, such as a device type of the computing device requesting the resource, an application type of an application used to access the resource, cookies stored on the computing devices, and GPS coordinates of the computing device requesting the resource, or combinations thereof. In some scenarios where users sign up for accounts that are employed to access corresponding resources from the service provider 110, data stored within the service provider's log records 114 include hashed authentication strings pertaining to the user's credentials (e.g., username and password). In implementations where a log record includes hashed authentication strings, these authentication strings remain hashed or otherwise encrypted to protect confidential user information. Information stored within a service provider log record 114 is used by the device linking application 108 to perform network-based probabilistic device linking, as discussed in further detail below with respect to FIGS. 2-6.

Having considered an example digital medium environment, consider now a discussion of some example details of a device linking application in accordance with one or more implementations.

Example Device Linking Application

Figure 2:
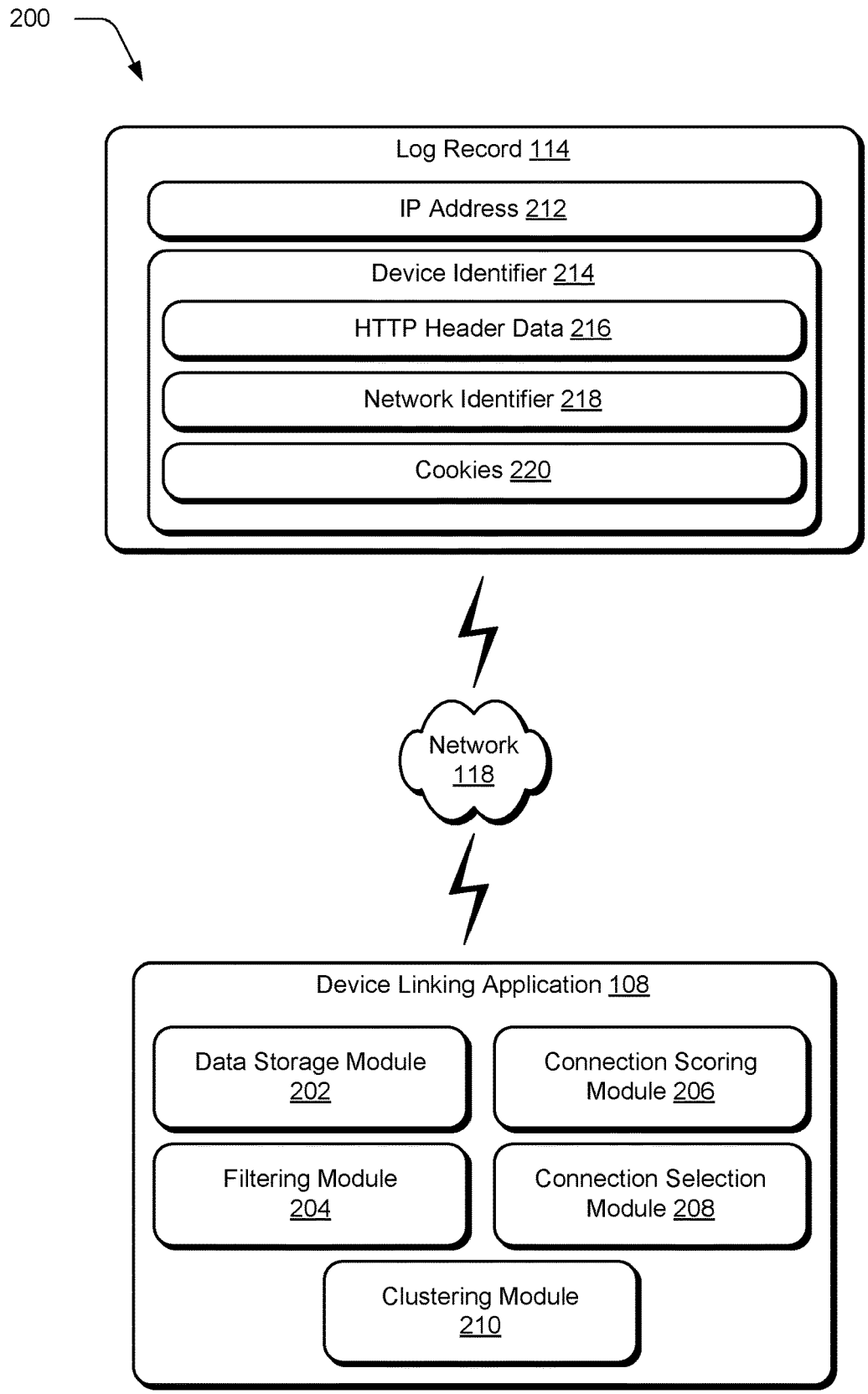
FIG. 2 illustrates an example service provider log record and an example device linking application in accordance with one or more implementations.

FIG. 2 illustrates a digital medium environment 200 that includes an example device linking application 108 that is configured to receive an example log record 114 via the network 118. In this implementation, the device linking application 108 includes a data storage module 202, a filtering module 204, a connection scoring module 206, a connection selection module 208, and a clustering module 210. The log record 114 is representative of data stored by a service provider when a computing device requests or otherwise accesses a resource from the service provider, and includes an IP address 212 and a device identifier 214. The IP address 212 represents an IP address, or at least a trace of an IP address, that is used by the computing device when requesting or accessing the resource. Thus, a log record 114 includes a single IP address 212 and a single device identifier 214. The device identifier 214 includes at least one of HTTP header data 216, a network identifier 218, and cookies 220 associated with the computing device accessing the resource. In accordance with one or more implementations, the HTTP header data 216 identifies at least one of a device type of the computing device accessing the resource (e.g., mobile device, desktop device, etc.) and an application type of an application used to access the resource (e.g., web browser, social networking application, etc.). In accordance with one or more implementations, the network identifier 218 identifies a type of network connection used by the computing device to connect in network 118 and access the resource. For example, network identifier 218 indicates that the computing device used one or more of a local area network (LAN) connection, a wireless broadband connection, a wired connection, and so on to access the resource. In accordance with one or more implementations, cookies 220 include hashed user credential information (e.g., username and password) associated with the accessed resource and preferences associated with prior interaction with the resource. This authentication information 220 remains hashed or otherwise encrypted so that the identity of a user accessing the resource remains confidential. Additionally or alternatively, device identifier 214 includes GPS coordinates associated with the computing device at the time the computing device accessed the resource. In one or more implementations where the device identifier 214 does not include GPS coordinates associated with the computing device, a location associated with the computing device can be inferred from the IP address 212.

The device linking application 108 is configured to receive a plurality of log records 114 from a variety of service providers, such as service providers 110 illustrated in FIG. 1. In accordance with one or more implementations, the device linking application 108 is configured to store IP addresses 212 and device identifiers 214, included in the received log records 114, in a data storage module 202. Alternatively, the device linking application 108 stores IP addresses 212 and device identifiers 214 remotely from the device linking application 108, such as within storage or memory of a computing device implementing the device linking application 108, such as computing device 102 illustrated in FIG. 1.

As discussed herein, a service provider generates a log record 114 every time a computing device accesses a resource. For example, if a computing device accesses a webpage of the service provider, a log record 114 is generated for the accessed web page. If the accessed webpage hosts additional resources, such as images, videos, articles, and the like, a log record 114 is generated for each image, video, article, and the like accessed by the computing device. Because even a single user's interaction with a single webpage can cause a service provider to generate a large number of log records 114, a possible number of IP addresses 212 and device identifiers 214 stored in data storage module 202 is limited only by the data storage module 202's available storage.

Because data storage module 202 is configured to store a virtually infinite amount of IP addresses 212 and associated device identifiers 214, computing linked devices becomes computationally unfeasible for computing devices implementing device linking application 108 that have limited processing power. Accordingly, in accordance with one or more implementations, the device linking application 108 employs filtering module 204 to reduce a number of the IP addresses 212 and device identifiers 214 that are considered when computing linked devices.

Filtering module 204 is representative of functionality that removes log records 114, IP addresses 212, and device identifiers 214 associated with certain devices from the data storage module 202. In accordance with one or more implementations, filtering module 204 removes any log records 114 that are associated with opted-out devices. For example, when a computing device accesses a resource from a service provider, such as service provider 110 illustrated in FIG. 1, the service provider causes display of an option for a user of the computing device to participate in cross-device linking. If the user indicates that he or she does not wish to participate in the cross-device linking, each log record 114 generated for that computing device will include an indication that the log record 114 should not be considered when computing linked devices. Alternatively, in accordance with one or more implementations, the service provider does not generate log records 114 for computing devices that opt-out of participation in cross-device linking In any implementation, this opt-out feature allows computing device users to control what information is gathered and shared by a service provider.

The filtering module 204 is additionally configured to remove a log record 114 from the data storage module 202 if the log record is associated with an IP address that occurs too many times in the data storage module 202. For example, in one or more implementations filtering module 204 determines a normal IP address frequency based on all the IP addresses stored in data storage module 202. If a log record 114 is associated with an IP address 212 that occurs more often than the normal IP address frequency, filtering module 204 removes the log record 114 from data storage module 202. Removing IP addresses that occur too frequently from data storage module 202 improves device linking precision and recall by removing public or otherwise unsecured networks that create false positives when performing the network-based probabilistic device linking techniques discussed herein.

Similarly, the filtering module 204 is configured to remove a log record 114 from the data storage module 202 if the log record is associated with a device identifier that occurs too many times in the Data Storage module 202. For example, in one or more implementations the filtering module 204 determines a normal device identifier frequency based on all the device identifiers stored in data storage module 202. If a log record 114 is associated with a device identifier 214 that occurs more often than the normal device identifier frequency, filtering module 204 removes the log record from data storage module 202. Removing device identifiers that occur too frequently from data storage module 202 improves device linking precision and recall by removing computing devices running automated tasks (i.e. Internet bots running scripts) at a higher rate than can be accomplished by a human user, which create false positives when performing the network-based probabilistic device linking techniques discussed herein.

In accordance with one or more implementations, the filtering module 204 is configured to remove a log record from the data storage module 202 if the log record includes a network identifier 218 that is associated with a temporary network connection or an incognito network session. The filtering module 204 determines that a log record 114 is associated with a temporary network connection or an incognito network session when a network identifier 218 of the log record indicates that the log record exists for less than a threshold period of time. In accordance with one or more implementations, the threshold period of time is a predetermined number of minutes, such as 30 minutes or 100 minutes. It is to be appreciated and understood however, that these example threshold periods of time are merely illustrative and that any amount of time may be designated as the threshold period of time. In an implementation, the filtering module 204 determines that a log record 114 is associated with a temporary connection by employing a heuristic model. The heuristic model identifies a frequency of individual log records 114 in the data storage module 202 as well as a recency associated with each log record 114 and assigns an individual score to each log record based on this frequency and recency.

By scoring log records 114 based on recency of the log record and frequency of an IP address and associated device identifier indicated in the log record, filtering module 204 removes log records 114 that correspond to resource usage outside a normal pattern of usage for the resource computing linked devices. Filtering module 204 then creates a distribution of the computed scores and removes a threshold percentile of log records from the distribution. For example, filtering module 204 may remove log records 114 from data storage module 202 having scores within the lowest 20% of the distribution. It is to be appreciated and understood however, that any suitable percentile may be used as the threshold percentile for removing log records.

In accordance with one or more implementations, the filtering module 204 removes a log record 114 from the data storage module 202 if the log record includes an IP address 212 that corresponds to a blacklist of IP addresses. In one or more implementations, a blacklist of IP addresses identifies IP addresses that belong to company networks or that are known to be reused by different devices with independent users. The blacklist of IP addresses can be uploaded by an administrator of a computing device implementing the device linking application 108, such as computing device 102 illustrated in FIG. 1. In accordance with one or more implementations, IP address blacklists are stored within data storage module 202. Removing log records 114 that are associated with blacklisted IP addresses reduces a number of false positives that may otherwise occur when performing the network-based probabilistic device linking techniques discussed herein.

After the filtering module 204 removes log records 114 from the data storage module 202 based on the criteria discussed above, the connection scoring module 206 scores connections between device identifiers 214 and IP addresses 212 include from log records 114 remaining in the data storage module 202.

Connection scoring module 206 is representative of functionality that calculates a score between a device identifier 214 and an IP address 212. In accordance with one or more implementations, connection scoring module 206 computes a score for a connection between an IP address and a device identifier based on how often the device identifier is associated with the IP address within a given timeframe. The given timeframe can be any suitable period and can be predetermined or can be specified by a user of the computing device implementing device linking application 108. For example, the given timeframe can be specified as one week. In this example, connection scoring module 206 identifies all log records 114 in the data storage module 202 that were generated within the past week. Each log record 114, representing a connection between an IP address 212 and a device identifier 214, receives a value of one. Assuming that there are 37 log records within the week timeframe associated with IP address X and device identifier Y, the connection score between IP address X and device identifier Y would be 37. Similarly, assuming that there are 200 log records within the week timeframe associated with IP address C and device identifier D, the connection score between IP address C and device identifier D would be 200.

In accordance with one or more implementations, connection scoring module 206 computes a score for a connection between an IP address and a device identifier for individual service providers, such as an individual service provider 110 illustrated in FIG. 1. Connection scores for individual service providers describe how often device identifiers are associated with an IP address during a given timeframe for a data set of the individual service provider. By scoring IP address and device identifier connections on a per-service provider basis, connection scoring module 206 normalizes connection scores that would otherwise be biased towards high-frequency service providers. For example, a high-frequency service provider, such as a social networking service provider, will generate a greater number of log records within a given time period then a lower frequency service provider. Accordingly, if frequency of connections between a device identifier and an IP addresses within a specified time period is the only criteria for scoring connections, connections associated with high-frequency service providers will receive higher scores. As discussed in further detail below, lower connection scores are disregarded for determining whether devices are linked. Thus, computing connection scores between an IP address and a device identifier for individual service providers ensures that linked devices are not determined solely based on connections associated with high-frequency service providers.

In accordance with one or more implementations, connection scoring module 206 assigns a weight to a service provider and uses the assigned weight to compute a score for a connection between an IP address and a device identifier associated with the service provider. Assigning a weight to a service provider can be performed in a variety of manners. For example, connection scoring module 206 can assign a weight to a service provider based on an average frequency at which resources are provided by the service provider. Alternatively or additionally, connection scoring module 206 assigns a weight to a service provider based on levels of precision and recall for clusters of linked devices that were previously generated from log records associated with the individual service provider. For example, if a first service provider generates clusters of linked devices with higher precision and recall values than a second service provider, the first service provider is assigned a greater weight than the second service provider. In addition to a weighting connection scores based on a service provider associated with a connection, connection scoring module 206 can weight connection scores based on a location associated with a connection.

In accordance with one or more implementations, connection scoring module 206 assigns a weight to a location associated with a device identifier and uses the assigned weight to compute a score for a connection between an IP address and the device identifier. Connection scoring module 206 identifies a location associated with a device identifier based on geolocation information included in HTTP header data 216 associated with the device identifier 214. Additionally or alternatively, connection scoring module 206 identifies a location associated with a device identifier based on a network provider specified by network identifier 218. Assigning a weight to a location associated with a device identifier can be performed in a variety of manners. For example, if a first location is associated with a densely populated city and a second location is associated with a rural area, connection scoring module 206 can assign a greater weight to connections associated with the second location. In this example, connections associated with a fewer number of users in the rural area are more likely to identify linked devices than a same number of connections in the densely populated city, thus the weights indicate a usefulness of the connection in identifying linked devices associated with a common entity. Alternatively, connection scoring module 206 computes connection scores associated with a specific location by assigning a weight of one to the specific location and assigning a weight of zero to all other locations. In addition to weighting connection scores based on locations associated with device identifiers, connection scoring module 206 can compute connections scores based on a time associated with the connection.

In accordance with one or more implementations, connection scoring module 206 assigns a weight to a time associated with a connection between an IP address and a device identifier and uses the assigned weight to compute a score for the connection. The time associated with a connection may be any suitable instance or period of time, such as a time of day, day of week, month of year, and so on. For example, connection scoring module 206 can assign a first weight to connections associated with weekdays and a second weight to connection scores associated with weekends. Alternatively, connection scoring module 206 can assign a weight to connections associated with business hours, such as during a 6:00 am to 6:00 pm window, and a different weight to connections associated with non-business hours. In this manner, connection scoring module 206 is configured to score connections between IP addresses and device identifiers based on time associated with a connection.

Connection scoring module 206 can compute connection scores by assigning weights to any one or combination of a type of service provider associated with a connection, a location associated with the connection, a network associated with the connection, and a time associated with the connection. Specific weights assigned to these various parameters used in a computing a connection score can be predetermined or can be specified by a user of the computing device implementing the device linking application 108. Alternatively, specific weights can be assigned to these various parameters by running experiments on test data sets of log records 114 and using experimental weights resulting in the best precision and recall for linked device clusters generated from the test data sets.

After the connection scoring module 206 scores connections between IP addresses and device identifiers, connection selection module 208 selects connections to be used in determining linked devices.

Connection selection module 208 is representative of functionality that selects connections between device identifiers 214 and IP addresses 212 for determining which device identifiers are associated with linked devices. In accordance with one or more implementations, connection selection module 208 selects the top scored connection between a device identifier and an IP address for each device identifier scored by connection scoring module 206. In this manner, connection selection module 208 limits consideration of connections between a device identifier and various IP addresses to a single IP address to which the device identifier is most closely associated. Alternatively, in one or more implementations connection selection module 208 selects a plurality of connections between different IP addresses, for a device identifier, to use in computing linked devices. In this manner, connection selection module 208 limits considerations of connections between a device identifier and various IP addresses to a plurality of IP addresses to which the device identifier is most closely associated. The number of connections that connection selection module 208 selects for a single device identifier can be any suitable number, and can be specified by a user of the computing device implementing device linking application 108.

In accordance with one or more implementations, connection selection module 208 selects, for a single device identifier, the top scored connection for each service provider associated with the device identifier. For example, if a device identifier is associated with three different service providers, connection selection module 208 selects the top scored connection between the device identifier and an IP address for each of the three different service providers. Alternatively, connection selection module 208 selects a plurality of top-scored connections associated with a service provider for each service provider associated with a device identifier. In this manner, connection selection module 208 selects the top scored IP address associated with different service providers used by a given device.

In accordance with one or more implementations, connection selection module 208 selects, for a single device identifier, the top scored connection for each geolocation associated with the device identifier. The boundaries of a geolocation used by the connection selection module 208 can encompass any suitable area, and can be specified by a user of the computing device implementing device linking application 108. For example, a user can instruct connection selection module 208 to select the top scored connection for each city associated with a different device identifier. In this example, if a device identifier 214 has IP address connections associated with two different cities, connection selection module 208 selects the top-scored connection between the device identifier and an IP address for each of the two cities. Alternatively, connection selection module 208 selects a plurality of top-scored connections associated with at least one geolocation for a device identifier. In this manner, connection selection module 208 selects the top scored IP addresses associated with individual geolocations used by a given device.

Alternatively or additionally, connection selection module 208 selects connections between a device identifier and at least one IP address based on one or any combination of parameters including a timeframe, a geolocation, or a service provider associated with the connection. These parameters can be specified by a user of the computing device implementing device linking application 108. For example, a user can instruct connection selection module 208 to select, for each a device identifier, the top two scored IP address connections during weekends in the San Francisco area. Thus, connection selection module 208 can select connections associated with a device identifier based on various combinations of any parameter used by connection scoring module 206 for scoring connections between a device identifier and an IP address. After connection selection module 208 selects connections between device identifiers and IP addresses, clustering module 210 computes linked devices from the selected connections and outputs clusters of linked devices.

Figure 4:
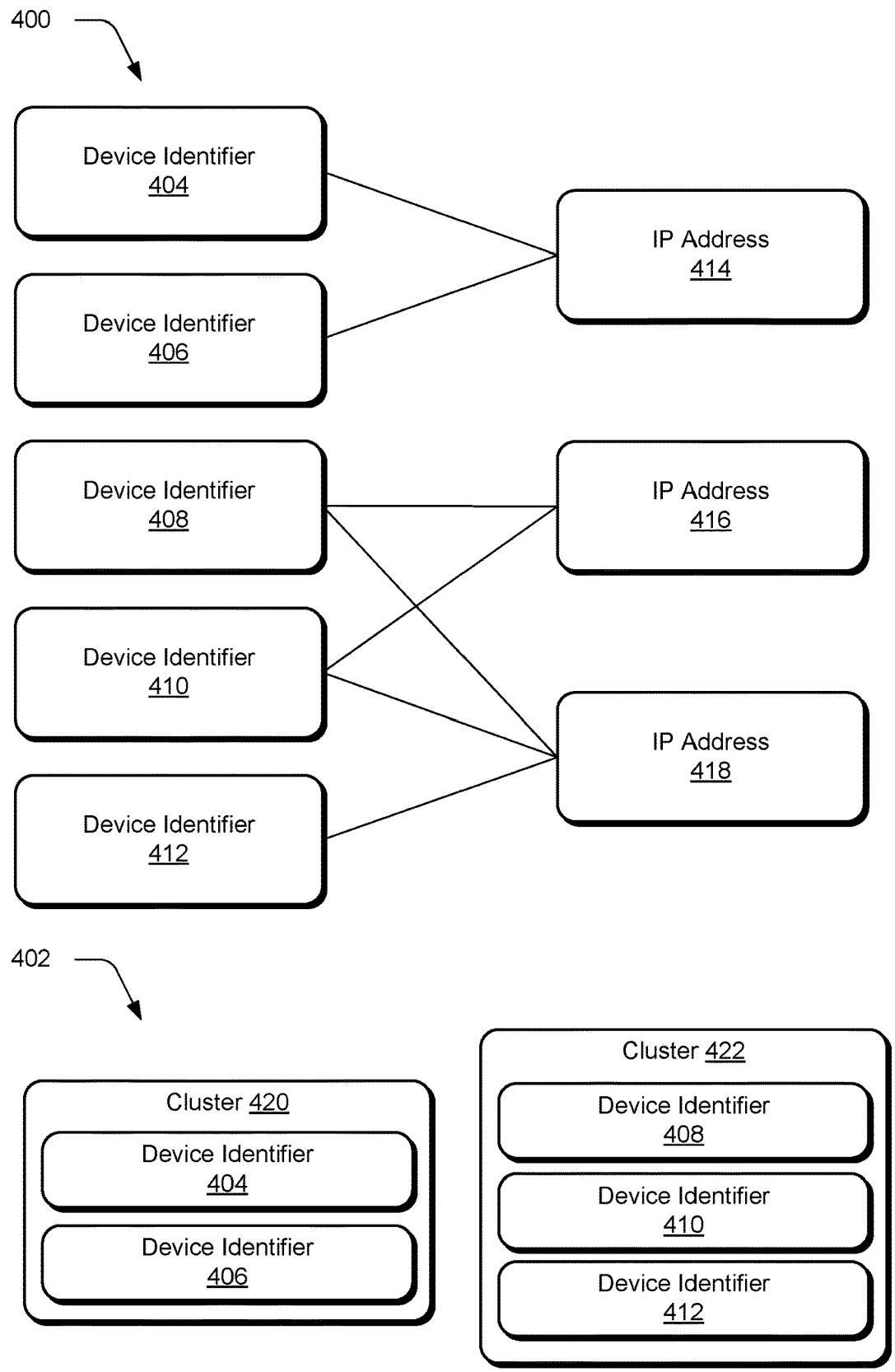
FIG. 4 illustrates example linked device clusters generated from selected connections between device identifiers and IP addresses in accordance with one or more implementations.

Clustering module 210 is representative of functionality that computes linked devices for a selected subset of connections between a device identifiers and IP addresses and outputs clusters of linked devices. As discussed herein, computing linked devices refers to identifying different devices having connections with similar IP addresses to determine linked devices that are associated with a common entity. Clustering module 210 computes linked devices from connections selected by connection selection module 208 by creating a graph with the selected connections. One side of the graph includes nodes corresponding to device identifiers and another side of the graph includes nodes corresponding to connected IP addresses. An example graph is illustrated in FIG. 4 and is discussed in further detail below. From the graph, clustering module 210 identifies different device identifiers that are associated with similar IP addresses and links different device identifiers based on their association with at least one similar IP address. Because the graph is constructed using top-scored connections between device identifiers and IP addresses from a subset of log records that were filtered by filtering module 204, different device identifiers associated with similar IP addresses are likely associated with a common entity. For example, clustering module 210 can identify that an IP address of a private household's wireless network is associated with five different device identifiers. The various devices associated with the five different device identifiers are computed as linked devices based on their association with the private household wireless network IP address. In accordance with one or more implementations, clustering module 210 proceeds iteratively through the graph until all device identifiers in the graph have been linked.

Alternatively, clustering module 210 links device identifiers in the graph by proceeding iteratively through the graph until a threshold percentage of device identifiers are linked. The threshold percentage of linked device identifiers may be any suitable percentage of overall device identifiers considered by the clustering module 210. In this implementation, clustering module 210 marks remaining device identifiers that are not linked as "poisoned" and ignores the poisoned device identifiers when outputting linked device clusters. Alternatively or additionally, clustering module 210 links device identifiers in the graph by proceeding iteratively through the graph until a threshold number of iterations are complete. The threshold number of iterations can be any suitable number. In this implementation, after completing the threshold number of iterations, clustering module 210 marks device identifiers that have not been linked as poisoned and ignores the poisoned device identifiers. Linked device identifiers are then grouped into clusters, where one cluster encompasses a group of linked device identifiers.

Clustering module 210 outputs at least one cluster of linked devices that are associated with a common entity. Continuing the previous example where clustering module 210 identified five different device identifiers connected to an IP address of a private wireless network, clustering module 210 is configured to output a cluster of linked devices that includes the five different device identifiers. In this manner, device linking application 108 filters connections between IP addresses and device identifiers, scores various connections between the IP addresses and device identifiers, and computes linked devices from the scored connections in a probabilistic manner Thus, the network-based probabilistic device linking techniques discussed herein identify linked devices for a common entity without ascertaining user identities associated with the linked devices.

In accordance with one or more implementations, in addition to the probabilistic device linking techniques discussed above, the device linking application 108 can use other device clusters to extend or merge clusters output by the clustering module 210. For example, device linking application 108 can store previously output linked device clusters in data storage module 202 and use this historic cluster data to expand or merge different clusters of linked devices. Alternatively or additionally, device linking application 108 can merge linked device clusters output by clustering module 210 with other linked device clusters that were not generated by device linking application 108. In this manner, device linking application 108 leverages past resource activity associated with a common entity to identify resources that are likely of interest to the common entity.

Having considered an example device linking application in accordance with one or more implementations, consider now example illustrations of connections between device identifiers and IP addresses.

IP Address Connections

Figure 3:
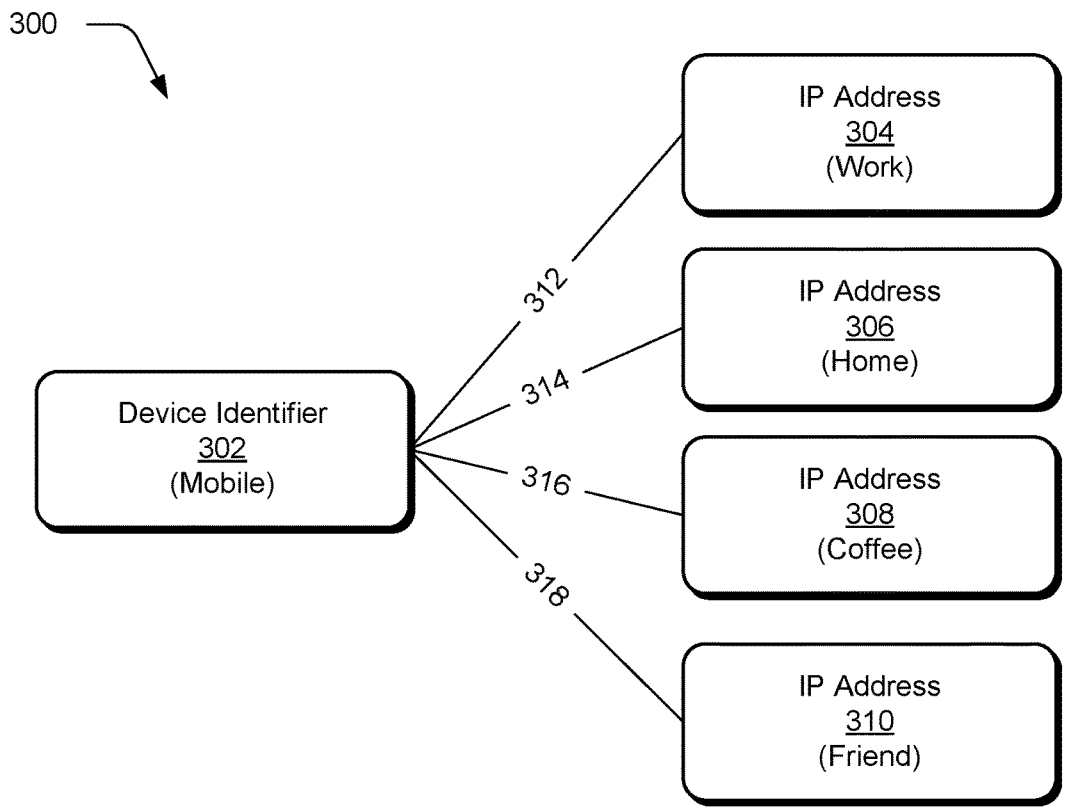
FIG. 3 illustrates example connections between device identifiers and IP addresses in accordance with one or more implementations.
Figure 3:
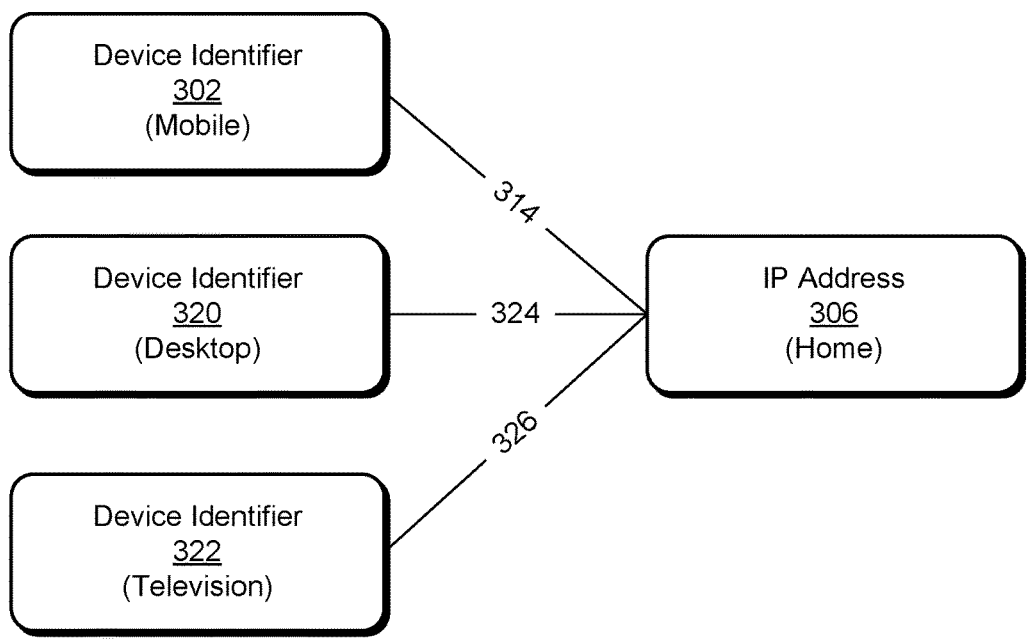

FIG. 3 illustrates an example 300 of various connections between device identifiers and IP addresses in accordance with one or more implementations. In the illustrated example 300, device identifier 302 corresponds to an individual user's mobile device. The device identifier 302 is associated with various IP addresses 304, 306, 308, and 310 based on resources accessed by the user's mobile device at locations corresponding to the various IP addresses. In the illustrated example 300, device identifier 302 is associated with IP address 304 when the user's mobile device accesses a resource while the user is at work. Device identifier 302 is associated with IP address 306 when the user's mobile device accesses a resource while the user is at home. Similarly, IP addresses 308 and 310 are associated with device identifier 302 when the user's mobile device accesses resources at a coffee shop or at a friend's house, respectively. Specifically, device identifier 302 is associated with IP address 304 via connection 312, with IP address 306 via connection 314, with IP address 308 via connection 316, and with IP address 310 via connection 318.

As discussed herein, each time a device accesses a resource, a service provider log record is generated. Accordingly, individual ones of connections 312, 314, 316, and 318 represent at least one service provider log record generated when the user's mobile device accessed a resource via a corresponding one of IP addresses 304, 306, 308, and 310. In accordance with one or more implementations, individual ones of connections 312, 314, 316, and 318 represent a large number of log records associated with device identifier 302 and the corresponding IP address. For example, assume that a user of the mobile device corresponding to device identifier 302 frequently uses the mobile device to access resources while at work and while at home. Conversely, assume that the user infrequently uses the mobile device to access resources while at the coffee shop and while at the friend's house. In this example, connections 312 and 314 are each representative of a larger number of log records than connections 316 and 318 for a given time period. However, it is to be appreciated and understood that individual connections 312, 314, 316, and 318 may each be associated with any number of service provider log records.

In accordance with one or more implementations, a connection score associated with individual connections 312, 314, 316, and 318 depends on a frequency of log records associated with the individual connection. For example, assume that the user of the mobile device associated with device identifier 302 most frequently uses the mobile device to access one resources when the user is at home. In this example, assuming that log record frequency is the only metric used for computing connection score, connection 314 is associated with a higher connection score than scores associated with connections 312, 316, and 318. Connection scores associated with individual connections can be computed using the techniques discussed herein. For example, connection scores associated with individual ones of connections 312, 314, 316, and 318 can be performed by connection scoring module 206 of device linking application 108, as illustrated in FIG. 2. Connection scores associated with individual connections can be used for selecting connections in linking devices, as discussed herein and in further detail below with respect to FIG. 4.

As illustrated in example 300, a single IP address can be associated with connections to various different device identifiers. For example, IP address 306 is illustrated as being associated with device identifiers 302, 320, and 322. In the illustrated example, device identifiers 320 and 322 correspond to a desktop device and television device, respectively, located at a home of the user of the mobile device corresponding to device identifier 302. The user's devices 302, 320, and 322 are associated with IP address 306 each time one of the devices accesses a resource via IP address 306. Specifically, device identifier 302 is associated with IP address 306 via connection 314, device identifier 320 is associated with IP address 306 via connections 324, and device identifier 322 is associated with IP address 306 via connection 326. Assume that connections 314, 324, and 326 represent the highest-scored connections between an IP address for each of device identifiers 302, 320, and 322. Under this assumption, the network-based probabilistic device linking techniques discussed herein will output a linked device cluster including device identifiers 302, 320, and 322. In accordance with one or more implementations, outputting this cluster of linked devices can be performed by clustering module 210 of device linking application 108, as illustrated in FIG. 2.

Having considered example connections between device identifiers and IP addresses, consider now examples of selected connections between device identifiers and IP addresses and example linked device clusters.

FIG. 4 illustrates an example 400 of a graph created from selected connections between device identifiers and IP addresses and an example 402 of linked device clusters generated from the selected connections, in accordance with one or more implementations. In the illustrated example 400, device identifiers 404, 406, 408, 410, and 412 are connected to at least one of IP addresses 414, 416, and 418. The device identifiers and IP addresses illustrated in example 400 represent a subset of scored connections selected for clustering linked devices. Individual connections between device identifiers and IP addresses are selected based on various parameters, as discussed herein. In accordance with one or more implementations, the selected subset of connections between device identifiers and IP addresses is selected by connection selection module 208 of device linking application 108, as discussed above and illustrated in FIG. 2.

In the illustrated example 400, device identifier 404 is connected to IP address 414. Device identifier 406 is connected to IP address 412, device identifier 408 is connected to IP addresses 416 and 418, device identifier 410 is connected to IP addresses 416 and 418, and device identifier 412 is connected to IP address 418. Using the techniques described herein, the illustrated connections between device identifiers and IP addresses in example 400 represent IP addresses that are most frequently used by individual device identifiers within a specified period of time. In accordance with one or more implementations, the connections illustrated in example 400 additionally represent connections scored based on one or more user-selectable parameters, such as any one or combination of a geolocation, a service provider, an instance of time, a period of time, and so on. Scoring connections can be performed using any combination of techniques discussed herein, and in accordance with one or more implementations is performed by the connection scoring module 206 of device linking application 108, as illustrated in FIG. 2.

This graphed subset of selected connections between device identifiers and IP addresses is used to determine linked devices associated with device identifiers. In accordance with one or more implementations, clusters of linked devices are generated from the graph in example 400 by clustering module 210 of device linking application 108, as illustrated in FIG. 2.

Example 402 illustrates example linked device clusters 420 and 422 in accordance with one or more implementations. Using the subset of selected connections in example 400, clustering module 210 clusters device identifiers associated with similar IP addresses. For instance, in the illustrated example 400, IP address 412 is associated via connections with both device identifiers 404 and 406. Based on their common association with IP address 412, device identifier 404 and device identifier 406 correspond to linked devices and are output in cluster 420. Although cluster 420 is a linked device cluster generated based on different device identifiers' connections with a single IP address, a linked device cluster can be generated based on device identifier connections with a plurality of IP addresses.

For instance, in the illustrated example 402, linked device cluster 422 includes device identifiers 408, 410, and 412, even though the device identifiers 408, 410, and 412 do not share a common connection with any single IP address. Although linked device clusters 420 and 422 are illustrated as including two and three device identifiers, respectively, it is to be appreciated and understood that a linked device cluster may include any number of device identifiers. After multiple device identifiers have been clustered based on their association with one or more IP addresses, the linked device clusters are output for analysis.

Having considered a device linking application configured to output linked device clusters based on IP address connections, consider now an example procedure in accordance with one or more embodiments.

Example Procedure

Figure 5:
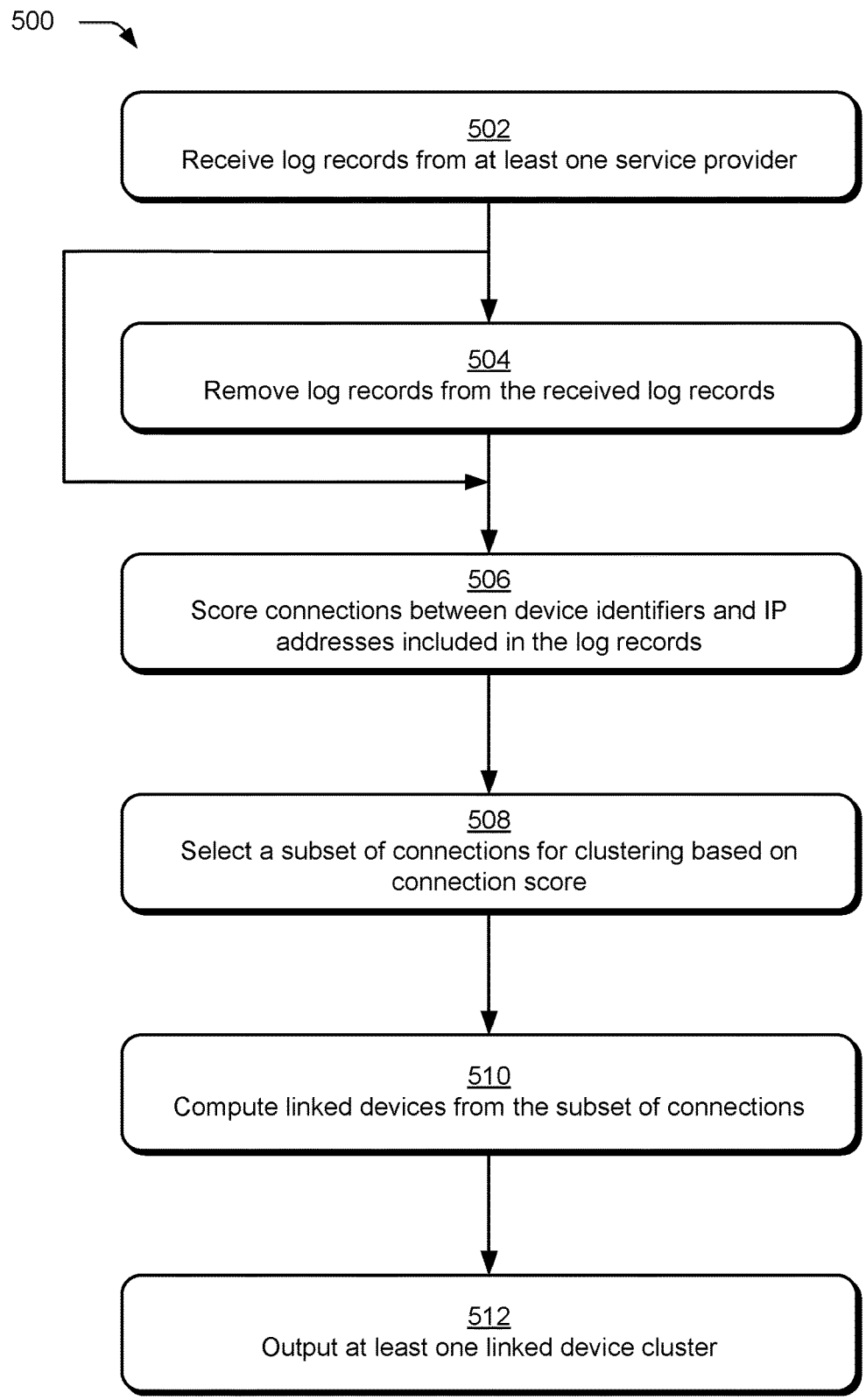
FIG. 5 is a flow diagram depicting an example procedure in accordance with one or more implementations.

FIG. 5 illustrates an example procedure 500 for outputting linked device clusters in accordance with one or more embodiments described herein. Aspects of the procedure may be implemented in hardware, firmware, or software, or a combination thereof. The procedure is shown as a set of blocks that specify operations performed by one or more devices and are not necessarily limited to the order shown for performing the operations by the respective blocks. In at least some embodiments, the procedure may be performed in a digital medium environment by a suitably configured device, such as the example computing device 102 of FIG. 1 that makes use of the device linking application 108, as described above.

Log records are received from at least one service provider (block 502). In accordance with one or more implementations, the log records are received by a computing device, such as computing device 102 of FIG. 1, via a network, such as network 118 of FIG. 1.

Some log records are then optionally removed from the received log records (block 504), as indicated by the arrow circumventing block 504. Log records may be removed from the received log records based on their association with an opted-out device, based on their association with an IP address that occurs too frequently, based on their association with a device identifier that occurs too frequently, based on their association with an incognito web browsing session, based on their association with a temporary connection, based on a list of blacklisted IP addresses, and so on.

After some of the log records are optionally removed from the received log records, connections between device identifiers and IP addresses included in the received log records are scored (block 506). The connection scores are indicative of a connection frequency between individual IP addresses and individual device identifiers over a specified period of time. Connection scores for IP addresses and associated device identifiers can be weighted based on various factors such as geolocation, service providers, time, device type, and so on.

A subset of connections are selected for generating linked device clusters based on their computed connection scores (block 508). The selected subset of connections may represent a top-scored IP address connection for each device identifier included in the received log records. The selected subset of connections may also represent a number of top-scored IP address connections for each device identifier included in the received log records. Other subsets of connections are also contemplated as being selected based on at least one of a geolocation associated with the connections, a timeframe associated with the connections, multiple IP addresses associated with the connections, and so on.

Device identifiers and IP addresses identified in the selected subset of connections are used to compute linked devices in the subset of connections (block 510). Computing linked devices can be performed by constructing a graph that includes device identifier nodes and IP address nodes and identifying device identifiers that have connections to similar IP addresses. Computing linked devices can be performed continuously until all device identifiers from the selected subset of connections have been linked or performed for a limited number of iterations through the graph. Devices identifiers determined to be associated with linked devices are then grouped into a cluster of linked devices to output at least one cluster of linked devices (block 512). In this manner, the techniques described herein may be employed to probabilistically determine linked devices based on their associated IP address connections.

Linked device clusters identify different computing devices that are associated with a common entity and enable comprehensive marketing analysis to be performed on resources accessed by the common entity among the different computing devices. The techniques discussed herein link different computing devices based on similar IP address usage rather than using confidential user credentials, which protects user security and accounts for a wider range of computing devices. Further, linked device clusters generated using the techniques described herein can be tailored to represent resource activity for at least one of specific times, locations, device types, service providers, and network connections. These linked device clusters have high precision and recall values and are generated with minimal computational cost by filtering out IP addresses and device identifier data not associated with a common entity before computing linked device clusters. By filtering down a large data set to identify relevant IP address and device connections without any prior training or parametrization, the linked device clusters discussed herein provide customizable insight into a common entity's overall resource interests, as opposed to a limited scope that would be provided from analyzing resources accessed by a single device.

Having considered an example procedure in accordance with one or more implementations, consider now an example system and device that can be utilized to practice the inventive principles described herein.

Example System and Device

Figure 6:
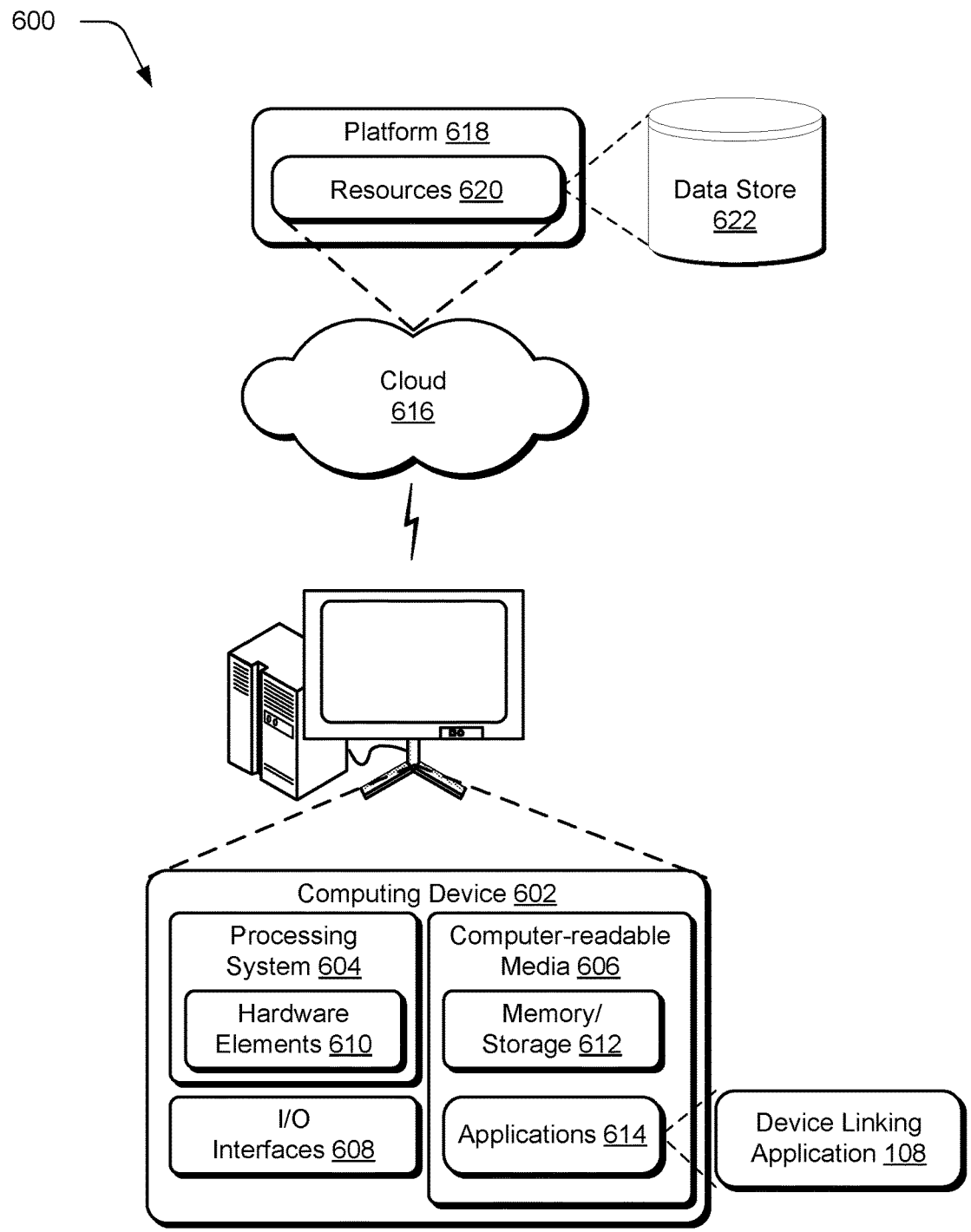
FIG. 6 illustrates an example system including various components of an example device that can be employed for one or more device linking implementations described herein.

FIG. 6 illustrates an example system generally at 600 that includes an example computing device 602 that is representative of one or more computing systems and/or devices that may implement the various techniques described herein. This is illustrated through inclusion of the applications 614 and, in particular, device linking application 108, which operates as described herein. The computing device 602 may be, for example, a server of a service provider, a device associated with a client (e.g., a client device), an on-chip system, and/or any other suitable computing device or computing system.

The example computing device 602 includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 616 via a platform 618 as described below.

The cloud 616 includes and/or is representative of a platform 618 for resources 620. The platform 618 abstracts underlying functionality of hardware (e.g., servers) and software resources of the cloud 616. The resources 620 may include applications and/or data of a data store 622 that can be utilized while computer processing is executed on servers that are remote from the computing device 602. Resources 620 can also include services provided over the Internet and/or through a subscriber network, such as a cellular or Wi-Fi network.

The platform 618 may abstract resources and functions to connect the computing device 602 with other computing devices. The platform 618 may also serve to abstract scaling of resources to provide a corresponding level of scale to encountered demand for the resources 620 that are implemented via the platform 618. Accordingly, in an interconnected device embodiment, implementation of functionality described herein may be distributed throughout the system 600. For example, the functionality may be implemented in part on the computing device 602 as well as via the platform 618 that abstracts the functionality of the cloud 616.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to link computing devices associated with a common entity, a method implemented by a computing device, the method comprising:
   receiving, by the computing device and from at least one service provider, log records that include a plurality of IP addresses and a plurality of device identifiers used to access service provider resources;
   filtering, by the computing device, prior to determining linked devices among the plurality of device identifiers, the log records by:
      generating an IP address frequency distribution from the log records, the IP address frequency distribution describing an occurrence of each of the plurality of IP addresses, relative to one another, in the log records;
      identifying a normal IP address frequency in the IP address frequency distribution; and
      removing log records having an associated IP address that occurs more often in the log records than the normal IP address frequency;
   generating, by the computing device, connection scores for connections between individual ones of the plurality of IP addresses and individual ones of the plurality of device identifiers, each of the connection scores being generated from the filtered log records by:
      identifying a location associated with a connected IP address and device identifier;
      assigning a scoring weight to the location based on a population associated with the location; and
      computing the connection score based on the scoring weight;
   selecting, by the computing device and prior to determining linked devices among the plurality of device identifiers, a proper subset of connections using the connection scores, the proper subset of connections comprising the plurality of device identifiers and, for each of the plurality of device identifiers, only one of the plurality of IP addresses with which the device identifier is most frequently connected;
   identifying, by the computing device, device identifiers from the proper subset that are connected to similar ones of the IP addresses to determine linked devices for a common entity; and
   outputting, by the computing device, a linked device cluster that includes the linked device identifiers for the common entity.

2. A method as described in claim 1, wherein the linked device cluster is output independent of ascertaining a username or a password for a user in the common entity.

3. A method as described in claim 1, wherein said generating connection scores is based at least in part on a connection frequency between an IP address and a device identifier in the received log records during a specified timeframe.

4. A method as described in claim 1, wherein said generating connection scores comprises:
   identifying a service provider associated with a connected IP address and device identifier;

assigning a scoring weight to the identified service provider; and generating a connection score based on the assigned scoring weight.

5. A method as described in claim 1, wherein the location associated with the connected IP address and device identifier is identified based on one of HyperText Transfer Protocol (HTTP) header data, a network identifier, or a cookie included in the device identifier.

6. A method as described in claim 1, wherein said generating connection scores comprises:

identifying a time associated with a connected IP address and device identifier;

assigning a weight to the identified time; and computing a connection score based on the assigned scoring weight.

7. A method as described in claim 1, wherein said selecting the proper subset of connections comprises selecting a top-scored IP address connection for each service provider associated with a device identifier for each of the plurality of device identifiers.

8. In a digital medium environment in which a computing device identifies linked devices based on device identifier and IP address connections, a computer-readable storage medium storing instructions that implement a filtering component which, responsive to execution by a computing device, perform improved device linking operations comprising:

receiving a plurality of service provider log records that each identify an IP address and a device identifier used to access a service provider resource;

filtering, prior to generating at least one linked device cluster from the plurality of service provider log records, the plurality of service provider log records by:

generating an IP address frequency distribution from the plurality of service provider log records, the IP address frequency distribution describing an occurrence of each of the IP addresses, relative to one another, in the plurality of service provider log records;

identifying a normal IP address frequency in the IP address frequency distribution; and removing service provider log records having an associated IP address that occurs more often in the plurality of service provider log records than the normal IP address frequency;

generating, from the filtered service provider log records and prior to generating at least one linked device cluster from the plurality of service provider log records, connection scores for connections between individual ones of the device identifiers and IP addresses identified in the plurality of service provider log records, each of the connection scores being generated by identifying a location associated with a connected IP address and device identifier, assigning a scoring weight to the location based on a population associated with the location, and computing the connection score based on the scoring weight;

selecting, from the filtered service provider log records and prior to generating at least one linked device cluster from the plurality of service provider log records, a proper subset of connections using the connection scores, the proper subset of connections comprising, for each device identifier identified in the plurality of service provider log records, only one IP address with which the device identifier is most frequently connected; and generating, from the proper subset of connections, the at least one linked device cluster including at least two of the device identifiers that are associated with a common entity.

9. A computer-readable storage medium as described in claim 8, wherein the common entity associated with the linked device cluster comprises a single user, a household of multiple users, a group of users in a common geolocation, multiple users of a corporation, or multiple users of an educational institution.

10. A computer-readable storage medium as described in claim 8, wherein said filtering the plurality of service provider log records comprises:

identifying at least one of the plurality of service provider log records as corresponding to a computing device that is opted-out of device linking; and removing the at least one of the plurality of log records that correspond to the opted-out computing device.

11. A computer-readable storage medium as described in claim 8, wherein said filtering the plurality of service provider log records comprises:

receiving a blacklist of IP addresses; and removing one or more service provider log records having an associated IP addresses that is included in the blacklist of IP addresses.

12. A computer-readable storage medium as described in claim 8, wherein filtering the plurality of service provider log records comprises:

identifying a device type of the device identifier included in individual ones of the plurality of service provider log records; and removing at least one service provider log record that is associated with a particular device type.

13. A computer-readable storage medium as described in claim 8, wherein said filtering the plurality of service provider log records comprises:

identifying, a temporary network connection threshold period of time; and removing one or more service provider log records that are associated with information indicating that the service provider log record fails to satisfy the temporary network connection threshold period of time.

14. A computer-readable storage medium as described in claim 8, wherein said filtering the plurality of service provider log records comprises:

identifying a location associated with each of the plurality of service provider log records; and removing one or more service provider log records that are associated with a specified location.

15. In a digital medium environment to link computing devices associated with a common entity, a system comprising:

one or more processors; and a computer-readable storage medium storing instructions that are executable by the one or more processors to perform operations comprising:

receiving, from at least one service provider, log records that include a plurality of IP addresses and a plurality of device identifiers used to access service provider resources;

filtering, prior to generating at least one linked device cluster from the log records, the log records by:

generating an IP address frequency distribution from the log records, the IP address frequency distribution describing an occurrence of each of the plurality of IP addresses, relative to one another, in the log records;

identifying a normal IP address frequency in the IP address frequency distribution; and removing log records having an associated IP address that occurs more often in the log records than the normal IP address frequency;

generating, from the filtered log records and prior to generating at least one linked device cluster from the log records, connection scores for connections between individual ones of the plurality of IP addresses and individual ones of the plurality of device identifiers, each of the connection scores being generated by identifying a location associated with a connected IP address and device identifier, assigning a scoring weight to the location based on a population associated with the location, and computing the connection score based on the scoring weight;

selecting, prior to generating at least one linked device cluster from the log records, a proper subset of connections using the connection scores, the proper subset of connections comprising the plurality of device identifiers included in the log records and, for each of the plurality of device identifiers, only one of the plurality of IP addresses with which the device identifier is most frequently connected;

identifying device identifiers from the proper subset that are connected to similar ones of the IP addresses to determine linked devices for a common entity; and outputting a linked device cluster that includes the linked device identifiers for the common entity.

16. A system as described in claim 15, wherein said generating connection scores comprises:

identifying a time associated with a connected IP address and device identifier;

assigning a weight to the identified time; and computing a connection score based on the assigned scoring weight.

17. A system as described in claim 15, wherein the linked device cluster is output independent of ascertaining a username or a password associated with the common entity.

18. A system as described in claim 15, wherein said generating connection scores comprises:

identifying a service provider associated with a connected IP address and device identifier;

assigning a scoring weight to the identified service provider; and generating a connection score based on the assigned scoring weight.

19. A system as described in claim 15, wherein the location associated with the connected IP address and device identifier is identified based on one of HyperText Transfer Protocol (HTTP) header data, a network identifier, or a cookie included in the device identifier.

20. A system as described in claim 15, wherein said selecting the proper subset of connections comprises selecting a top-scored IP address connection for each service provider associated with a device identifier for each of the plurality of device identifiers.

* * * * *